United States Patent [19]

Tamura et al.

[11] 4,259,415
[45] Mar. 31, 1981

[54] PRIMARY BATTERY

[75] Inventors: Kohki Tamura, Hitachi; Toshiki Kahara, Tokai; Tatsuo Horiba, Hitachi; Noboru Ebato, Hitachi; Osamu Asai, Hitachi, all of Japan

[73] Assignees: Hitachi, Ltd.; Hitachi Chemical Co. Ltd., both of Tokyo, Japan

[21] Appl. No.: 74,522

[22] Filed: Sep. 11, 1979

[30] Foreign Application Priority Data

Sep. 14, 1978 [JP] Japan .................. 53/112222

[51] Int. Cl.³ ............................................... H01M 6/14
[52] U.S. Cl. ........................................ 429/90; 429/91; 429/194; 429/218
[58] Field of Search ................... 429/91, 90, 219, 224, 429/218, 194

[56] References Cited

U.S. PATENT DOCUMENTS

| 2,942,052 | 6/1960 | Bourke et al. | 429/91 |
| 3,757,793 | 9/1973 | Fester et al. | 429/92 X |
| 3,907,597 | 9/1975 | Mellors | 429/224 X |
| 4,016,338 | 4/1977 | Lauck | 429/194 X |
| 4,025,700 | 5/1977 | Fagan, Jr. et al. | 429/91 |
| 4,132,836 | 1/1979 | Greatbatch | 429/91 |
| 4,144,382 | 3/1979 | Takeda et al. | 429/91 |

Primary Examiner—Anthony Skapars
Attorney, Agent, or Firm—Craig and Antonelli

[57] ABSTRACT

A primary battery comprises a negative active material such as lithium, a positive active material and a non-aqueous electrolyte, wherein the positive active material further comprises a main positive active material such as manganese dioxide which takes main part in a primary discharge reaction together with the negative active material through the non-aqueous electrolyte and a precursor such as vanadium pentoxide or lead dioxide which takes part in the primary discharge reaction and produces a sub-positive active material, which takes part in a secondary discharge reaction.

12 Claims, 3 Drawing Figures

PRIMARY BATTERY

BACKGROUND OF THE INVENTION

This invention relates to a primary battery in which a light metal such as lithium is used as a negative active material, especially a primary battery, the exchange timing of which is easily recognized.

Recently, there has been increased use of a battery having high energy density for an electronic apparatus, such as arm watch, small typed calculator, etc., in which a material for indication such as liquid crystal, light emitting diode, etc., is used.

As an example of the battery having high energy density, primary batteries have been developed in which light metals such as lithium, sodium, etc., are used as negative active materials.

Those batteries above have the advantage that the battery voltage does not change very much with the time duration of use, but have the simultaneous disadvantage that the battery voltage decreases suddenly when the life time of the battery comes to an end, which results in the decrease or stop of the function of the apparatus using those type of the battery.

Those problems seem to be solved by using a mechanism for indicating life time such as lamp, volt meter, etc., along with the battery; but, it is troublesome to watch the volt meter all the time and difficult to define the voltage value for causing the mechanism to indicate life time to operate due to the sudden drop of the battery voltage.

One solution for those problems above is provided by changing the characteristics of the battery so that the discharge voltage of the battery changes more than two steps, whereby the life time of the battery is easily indicated (Japanese Patent Laid-Open No. 51-62333).

Specifically speaking, the Japanese Patent Laid-Open No. 51-62333 discloses a battery comprising a negative active material, a positive active material and a non-aqueous electrolyte, wherein the positive active material comprises a main positive active material which takes part only in a primary discharge and a sub-positive active material which takes part only in a secondary discharge.

The solution above has advantage that the life time of the battery is indicated through the difference of the discharge voltage, but has a simultaneous disadvantage that the energy density on which the life time of the battery depends is defined by the amount of the main positive active material taking part only in the primary discharge. This is because the life time of the battery is defined by the time duration of the primary discharge.

Accordingly, as the amount of the sub-positive active material contained in the battery increases, the amount of the main positive active material decreases and the life time of the battery decreases, because the total volume of the battery is limited.

SUMMARY OF THE INVENTION

An object of this invention is to provide a primary battery having a long life time and a function for indicating the life time of the battery.

The present invention provides a primary battery, which comprises a negative active material, a positive active material and a non-aqueous electrolyte, wherein the positive active material comprises a main positive active material which takes part in a primary discharge and a precursor which takes part in the primary discharge and produces a sub-positive active material which takes part in a secondary discharge.

According to the present invention the energy density of the battery is high, accordingly, the life time of the battery is long, because the positive active material comprises only such materials that take part only in the primary discharge.

According to the present invention the exchange timing of the battery is easily recognized when the life time of the battery comes to an end, because the positive active material contains the precursor which produces the sub-positive active material taking part in the secondary discharge, the voltage of which is different from that of the primary discharge.

DETAILED DESCRIPTION OF THE PREFERRED EMBODIMENT

Figure 1:
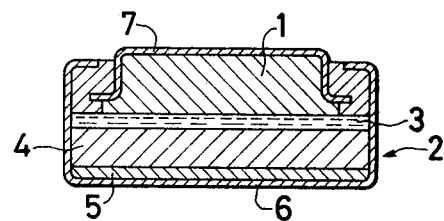
FIG. 1 is a cross-sectional view of a primary battery according to the present invention.

Refer to FIG. 1 the structure of a primary battery according to the present invention is shown, which comprises a layer of negative active material 1 comprising a light metal such as lithium, a layer of positive active material 2, and a separator 3 comprising a non-aqueous electrolyte described hereinafter.

The layer of positive active material 2 is arranged opposite to the layer of negative active material 1 through the separator 3 and further comprises a layer of a main positive active material 4 and a layer of precursor 5.

The layer of main positive active material 4 is arranged opposite to the layer of negative active material 1 through the separator 3 and takes main part in a primary discharge together with the layer of negative active material 1 through the separator 3.

The layer of precursor 5 is arranged opposite to the separator 3 through the layer of main positive active material 4, takes part in the primary discharge together with the layer of negative active material 1 through the separator 3 and produces a sub-positive active material as a reaction product by the primary discharge reaction. The sub-positive active material takes part in a secondary discharge following the primary discharge and provides a different discharge voltage therefrom together with the layer of negative active material 1 through the separator 3 within the voltage limited to use.

The layer of negative active material 1, the separator 3 and the layer of positive active material 2 are housed in a cathode can 6 and covered with an anode cap 7.

Spaces formed between the cathode can 6 and the anode cap 7 are sealed by means for sealing such as gasket.

The layer of negative active material 1 comprises one selected from the group of a light metal consisting of lithium (Li), sodium (Na), magnesium (Mg), calcium (Ca), aluminum (Al), and alloys thereof. Lithium is preferable for providing a battery having a high energy density and a high discharge voltage.

The layer of main positive active material comprises one selected from the group consisting of manganese dioxide ($MnO_2$), molybdenum oxide ($MoO_3$), tungsten oxide ($WO_3$), silver oxide ($Ag_2O$), graphite fluoride (CF)n, cupper fluoride ($CuF_2$), cobalt fluoride ($CoF_2$), nickel fluoride ($NiF_2$) and sulfur dioxide ($SO_2$). Manganese dioxide is preferable for providing a battery with a reduced cost.

The layer of precursor 5 comprises one selected from the group of oxyacid salts consisting of vanadium pentoxide ($V_2O_5$), lead dioxide ($PbO_2$), silver chromate ($Ag_2CrO_4$), lead chromate ($PbCrO_4$), silver tungstate ($Ag_2WO_4$), silver molybdate ($Ag_2MoO_4$), lead molybdate ($PbMoO_4$) and silver sulfate ($Ag_2SO_4$). Vanadium pentoxide and lead dioxide are preferable for providing a battery with a reduced cost.

The separator 3 comprises one selected from the group of organic solvents consisting of propylene carbonate, tetrahydrofuran, $\gamma$-butyrolactone and nitrobenzene, or one selected from the group of organic electrolyte made by dissolving lithium perchlorate, tetrachloro aluminum lithium or lithium borofluoride in a mixture of the organic solvents described above.

The primary discharge comprises two discharge reactions; one which is carried out when ionized negative materials 1 reacts on the layer of main positive active material 4 through the separator 3, and the other which is carried out when the former discharge reaction comes to an end and the ionized negative active materials further reacts on the layer of precursor 5 through the separator 3.

The discharge voltage in the process of the latter discharge reaction carried out between the negative active material 1 and the precursor 5 is substantially equal to that in the process of the former discharge reaction carried out between the negative active material 1 and the main positive active material 4.

Accordingly, the time duration of the primary discharge is the total amounts of that of the former discharge reaction and that of the latter discharge reaction, whereby high energy density, i.e., long life time of the battery is obtained.

The life time of the battery depends on the amount of the main positive active material 4 and the precursor 5 and does not depend on the amount of the sub-positive active material, because the sub-positive active material is produced through the process of the precursor discharge reaction and the secondary discharge reaction is carried out when the ionized negative active materials reacts on the sub-positive active material.

The discharge voltage of the secondary discharge reaction is normally defined to be lower than that of the primary discharge reaction, whereby the exchange timing of the battery is recognized.

As means for detecting the discharge voltage of the secondary discharge reaction conventional means is available, which is used for arm watch, calculator, etc.

According to the present invention, the primary discharge reaction is carried out with stability and high efficiency by arranging the layer of main positive active material 4 opposite to the layer of negative active material 1 through the separator 3, and the secondary discharge reaction is carried out with stability and high efficiency by arranging the layer of precursor 5 opposite to the separator 3 through the layer of main positive active material 4, because the ionized negative active material 1 reacts on only the main positive active material 4 in the former reaction and only on the sub-positive active material formed by the primary discharge of the precursor 5 in the latter reaction through the separator 3.

The positive active material 2 may be prepared by mixing the main positive active material 4 with the precursor 5 instead of forming a respective layer.

The time duration of the secondary discharge is defined according to the purposes for which batteries are used. It changes according to the kind of the positive active material and the negative active material, the mixture ratio of the main positive active material with the sub-positive active material, and the electric current value required for apparatus.

EXAMPLE I

The primary battery according to the present invention comprises a layer of negative active material consisting of lithium, a mixture layer of main positive active material comprising manganese dioxide as a great portion thereof, a mixture layer of precursor comprising vanadium pentoxide as a great portion thereof and a separator comprising a non-woven fabric of polypropylene fiber impregnated with a solution (1 mol/l) of proylene carbonate mixed with a lithium perchlorate.

The mixture layer of main positive active material is prepared by mixing manganese dioxide, the amount of which is equivalent to 180 mAh in the theoretical capacity, with carbon powder as electric conductive material and fluoride resin powder such as polytetrafluoroethylene powder as binder so that the mixture ratio is manganese dioxide of 90% by weight, carbon powder of 5% by weight and resin powder of 5% by weight.

The mixture layer of precursor is prepared by mixing vanadium pentoxide, the amount of which is equivalent to 20 mAh in the theoretical capacity, with carbon powder and fluoride resin powder such as polytetrafluoroethylene powder so that the mixture ratio is vanadium pentoxide of 90% by weight, carbon powder of 5% and resin powder of 5% by weight.

The mixture layer of precursor is press-packed on one side of a cathode can so as to contact therewith.

The mixture layer of main positive active material is press-packed on the mixture layer of precursor.

The layer of negative active material is packed on the mixture layer of main positive active material through the separator.

The size of the primary battery according to the present invention is 20 mm in diameter and 4 mm in height.

Figure 2:
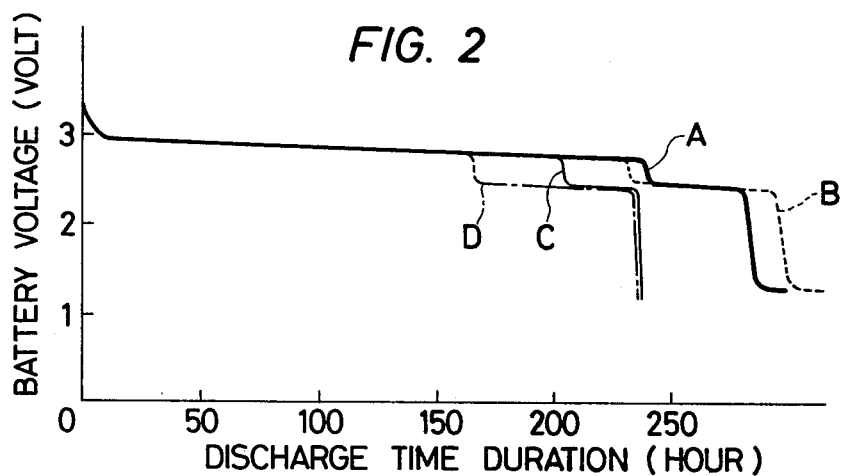
FIG. 2 and FIG. 3 show the change with time of the battery voltage of the primary battery according to the present invention in the process of discharge reaction.

The change with time of the battery voltage of the primary battery connected with a resistor of 3.5 k$\Omega$ according to the present invention is shown as A and B in FIG. 2 together with comparative examples C and D.

"A" represents the characteristic curve of the primary battery comprised as above and "B" represents the same of the primary battery comprised as above except that the mixture layer of main positive active material contains manganese dioxide, the amount of which is equivalent to 160 mAh in the theoretical capacity, and the mixture layer of precursor contains vanadium pentoxide, the amount of which is equivalent to 40 mAh in the theoretical capacity.

The comparative examples C and D represent the characteristic curve of the comparative battery comprising a negative active material comprising lithium, a main positive active material comprising manganese dioxide, the amount of which is equivalent to 180 mAh and 160 mAh, respectively, in the theoretical capacity, and a sub-positive active material comprising nickel fluoride, the amount of which is equivalent to 20 mAh and 40 mAh, respectively, in the theoretical capacity.

In FIG. 2 abscissa represents discharge time duration (hour) and ordinate represents battery voltage (Volt).

As understood from FIG. 2 the comparative examples show that the life time of the battery depends on the amount of the main positive active material and the increase of the amount of the sub-positive active material results in the decrease of the life time of the battery.

To the contrary according to the present invention the life time of the battery depends on the total amount of the main positive active material and the precursor and the increase of the amount of the precursor results in the very slight decrease of the life time of the battery.

EXAMPLE II

Another primary battery according to the present invention is provided as described in Example I except for the employment of lead dioxide as precursor.

Figure 3:
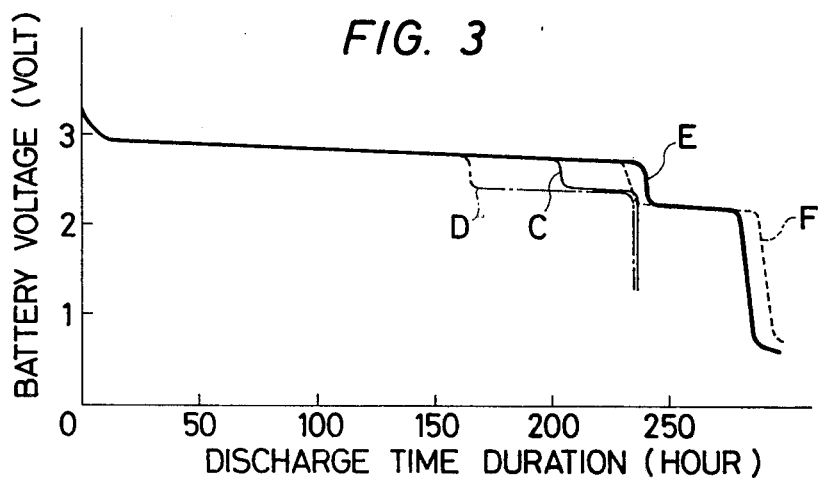

FIG. 3 shows as E and F the change with time of the battery voltage of another primary battery according to the present invention together with the same comparative examples C and D as above.

The life time of the battery according to the present invention is increased as compared to the comparative examples, because the total amounts of the main positive active material take part is the primary discharge reaction.

We claim:

1. Primary battery comprising:
a non-aqueous electrolyte,
a negative active material comprising a light metal, and
a positive active material comprising a main positive active material which reacts with said negative active material through said non-aqueous electrolyte to form one part of a primary discharge of said battery, and a precursor which reacts with said negative active material through said non-aqueous electrolyte to form another part of the primary discharge and which produces a sub-positive active material as a reaction product of the other primary discharge reaction, the sub-positive active material reacting with said negative active material through said non-aqueous electrolyte to form a secondary discharge therebetween.

2. Primary battery as set forth in claim 1, wherein the voltage and the time duration of the primary discharge are greater than those of the secondary discharge, respectively.

3. Primary battery as set forth in claim 1 or 2, wherein the voltage of the primary discharge in the process of the reaction between said negative active material and said precursor is substantially equal to that in the process of the reaction between said negative active material and said main positive active material.

4. Primary battery as set forth in claim 1, wherein said positive active material is arranged opposite to said negative active material through said non-aqueous electrolyte.

5. Primary battery as set forth in claim 1 or 4, wherein said positive active material comprises a mixture of said main positive active material and said precursor.

6. Primary battery as set forth in claim 5, wherein said positive active material contains an electric conductive material and a binder.

7. Primary battery as set forth in claim 1, wherein said main positive active material and said precursor are arranged so as to form a layer, respectively.

8. Primary battery as set forth in claim 1, 4 or 7, wherein said precursor is arranged opposite to said non-aqueous electrolyte through said main positive active material.

9. Primary battery as set forth in claim 1, wherein said negative active material comprises a member selected from the group of a light metal consisting of lithium, sodium, magnesium, calcium, aluminum and an alloy thereof; said main positive active material comprises one selected from the group consisting of manganese dioxide, molybdenum oxide, tungsten oxide, silver oxide, graphite fluoride, cupper fluoride, cobalt fluoride, nickel fluoride and sulfur dioxide, said precursor comprises one selected from the group consisting of vanadium pentoxide, lead dioxide, silver chromate, lead chromate silver tungstate, silver molybdate, lead molybdate, and silver sulfate.

10. Primary battery as set forth in claim 1 or 9, wherein said negative active material comprises lithium, said main positive active material comprises manganese dioxide, and said precursor comprises a member selected from the group consisting of lead dioxide and vanadium pentoxide.

11. Primary battery comprising:
a separator comprising a layer of a non-aqueous electrolyte,
a layer of negative active material comprising lithium, and
a layer of positive active material comprising a layer of main positive active material and a layer of precursor,
said layer of main positive active material is arranged opposite to said layer of negative active material through said separator and comprises manganese dioxide as a great portion thereof and reacts with said negative active material to establish a first part of a primary discharge of said battery through said separator, and
said layer of precursor is arranged opposite to said separator through said layer of main positive active material and comprises a member selected from the group consisting of vanadium pentoxide and lead dioxide as a great portion thereof which reacts with said negative active material through said separator to establish a second part of the primary discharge through said separator and which produces a sub-positive active material as a reaction product of the second primary discharge reaction, and the sub-positive active material reacts with said layer of negative active material to establish a secondary discharge following the primary discharge.

12. Primary battery as set forth in claim 11, wherein said layer of main positive active material is made by mixing manganese dioxide, the amount of which is equivalent to 160 mAh in the theoretical capacity, with carbon powder as electric conductive material and polytetrafluoroethylene powder as binder thereof, the mixture containing manganese dioxide in an amount of 90% by weight, carbon powder in an amount of 5% by weight and polytetrafluoroethylene powder in an amount of 5% by weight, said layer of precursor is made by mixing a member selected from the group consisting of vanadium pentoxide and lead dioxide with carbon powder and polytetrafluoroethylene powder so that the mixture ratio of said carbon powder and polytetrafluoroethylene to the precursor is the same as said layer of main positive active material, the amount of precursor being equivalent to 40 mAh in the theoretical capacity, and said separator comprises a non-woven fabric of polypropylene fiber impregnated with the solution of propylene carbonate mixed with a lithium perchlorate.

* * * * *